Nov. 10, 1959  M. H. HAYES  2,912,671
VELOCITY MEASURING METHOD AND APPARATUS
Filed June 14, 1956  2 Sheets-Sheet 1

MONSON H. HAYES
INVENTOR

BY *Darby & Darby*
ATTORNEYS

Nov. 10, 1959  M. H. HAYES  2,912,671
VELOCITY MEASURING METHOD AND APPARATUS
Filed June 14, 1956  2 Sheets-Sheet 2

MONSON H. HAYES
*INVENTOR.*

BY *Darby & Darby*
ATTORNEYS

United States Patent Office 2,912,671
Patented Nov. 10, 1959

2,912,671

VELOCITY MEASURING METHOD AND APPARATUS

Monson H. Hayes, Menlo Park, Calif., assignor to Link Aviation, Inc., Binghamton, N.Y., a corporation of New York Application June 14, 1956, Serial No. 591,412

4 Claims. (Cl. 340—3)

My invention relates to method and apparatus for use in navigation systems and the like for determining the velocity of an object with respect to another object. For example, a vehicle equipped with apparatus constructed in accordance with the invention may utilize such apparatus to determine its velocity with respect to the earth or some other fixed object or with respect to a second vehicle. As another example, the invention may be located at a fixed station and used to determine the velocity at which a moving object approaches or recedes from the fixed station.

A number of inertial guidance and navigation systems known to those skilled in the art utilize acceleration measuring means to derive computer input data commensurate with vehicle acceleration in space. This data is then integrated with respect to time to provide velocity data, which may again be integrated to obtain position data. Since the double integration greatly magnifies any errors in operation of the acceleration measuring means, it is often desirable to utilize velocity measuring means and a single integration to provide position data. The use of Sonic Doppler and electromagnetic doppler to determine vehicle velocities is well known. Each of the systems of which I am aware, however, derives a quantity having a magnitude which is commensurate with a vehicle velocity by making a direct measurement of the doppler or frequency shift between the frequencies of the transmitted and received energy. In addition, in order that this direct measurement of doppler have significance as a measure of velocity it is necessary that the actual velocity of wave propogation through the medium and the angle of propagation of energy be known. It is also necessary that the frequency of propagation be determined with great accuracy. Any errors in measuring any of the quantities provide errors in a computed velocity. As a result, the integration with time of this erroneous velocity data in a navigation system will lead to an increasingly inaccurate position.

The invention, on the other hand, does not depend upon a measurement of the absolute magnitude of the Doppler quantity, but instead forces such quantity to become very nearly zero. As is apparent to those skilled in the art, the presence or absence of a quantity may be detected with much greater accuracy than the absolute measurement of a quantity, so that far less error will occur if the invention is utilized. Also, the invention does not depend on an absolute measurement of propagation angle, velocity of energy through the medium, or the frequency of propagation.

When used on a moving vehicle, the invention may be briefly described as contemplating the emission of energy at a reference frequency from a radiating means carried on the vehicle, receiving energy reflected or echoed from an object, comparing the difference in frequency of the emitted energy and the reflected energy to provide a difference or Doppler frequency, utilizing said difference frequency to translate said radiating means on said vehicle in such a direction and at such a velocity as to minimize said difference frequency, and measuring the rate of translation of said radiating means on said vehicle to determine the velocity of said vehicle with respect to said object. The invention contemplates the use of transmitted energy of many different types, including electromagnetic radiation as well as sound or mechanical energy used in the illustrative embodiment hereinafter described.

It is therefore a primary object of the invention to provide improved method and apparatus for determining the relative velocity between two objects.

It is another object of this invention to provide a doppler method and apparatus for determining the relative velocity between two objects without measuring frequency shift.

It is a further object of this invention to provide a doppler method and apparatus for determining the relative velocity between two objects without actually measuring the velocity of wave propagation in the medium.

It is an additional object of this invention to provide a doppler method and apparatus for determining the relative velocity between two objects without measuring the angle of propagation.

It is another object of this invention to provide a doppler method and apparatus for determining the relative velocity between two objects where the frequency of transmission need not be determined with great accuracy.

It is a further object of this invention to provide a doppler method and apparatus for determining the relative velocity between two objects which is unaffected by changes of the properties or drift of the medium.

Other and further objects of this invention will become apparent to those skilled in the art as the description proceeds. The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims. For a better understanding of the invention, however, reference may be had to the following specification, taken in conjunction with the accompanying drawings, wherein:

Figure 1:
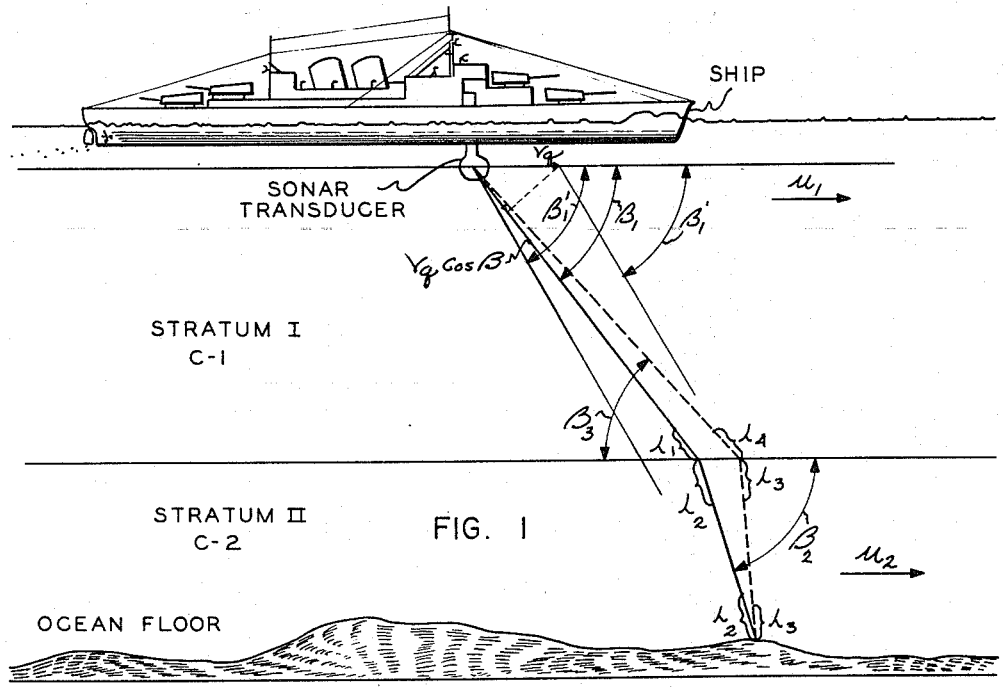
Fig. 1 is a diagrammatic view of a vessel utilizing a sonic doppler system and illustrating sound propagation through a medium made up of more than one stratum.

Referring to Fig. 1, assume that the vessel shown therein is moving along the surface at a velocity $V_g$. Although the water is shown in Fig. 1 as comprising several strata having different velocities of flow and velocities of sound propagation, assume initially that the water medium is homogenous. A conventional sonic transducer, of either magnetostrictive, piezoelectric or electromagnetic type may be excited by an oscillator at a frequency $f_0$, compressing the water at the fundamental sonic frequency $f_0$. The compression peaks of the resulting sound wave travel in a narrow beam downwardly at an angle $\beta_1$ with respect to horizontal. If the ship were standing still, the successive peaks of the compression waves would travel through the water with a velocity of propagation $c_1$ determined by the characteristics (such as temperature, for example) of the medium, with a separation or wavelength $\lambda_0$, where $$\lambda_0 = \frac{c_1}{f_0} \qquad (1)$$

However, a velocity of the vessel in the direction of transmission causes the wavelength to be shortened in an amount equal to the component of vessel travel in the direction of wave propagation during one cycle of transmission. Inspection of Fig. 1 indicates that this component distance equals:

$$\frac{V_s \cos \beta_1}{f_0} \quad (2)$$

Thus the apparent wavelength $\lambda_1$ of the propagated waves in the medium may be seen to be:

$$\lambda_1 = \frac{c_1}{f_0} - \frac{V_s \cos \beta_1}{f_0} \quad (3)$$

It may be noted that while ship velocity modifies the wavelength of the transmitted waves, that once the waves have been propagated they are independent of ship motion and travel at the medium propagational velocity $c_1$. The waves strike the sea floor and reflect in all directions. It may be noted that the angle of incidence of the transmitted waves on the sea floor is immaterial as far as the frequency or wavelength of the reflected waves are concerned, although it does affect the strength or amplitude of the reflected signals received by the ship.

Upon return of the reflected waves to the ship, the compression waves of length $\lambda_1$ travelling with a velocity $c_1$ move past the vessel, which is assumed to have remained at the same velocity, so that the velocity component of the ship in the direction opposite the reflected waves is approximately $V_s \cos \beta_1$. Thus the vessel's receiving sonic head intercepts a compression peak once every $$\frac{\lambda_1}{C_1 + V_s \cos \beta_1} \text{ units of time} \quad (4)$$

so that the frequency of the signals received by the sonar receiver is $$f_R = f_0 \frac{C_1 + V_s \cos \beta_1}{C_1 - V_s \cos \beta_1} \quad (5)$$

It will be seen that since the velocity of wave propagation $C_1$ is quite large compared to ship velocity $V_g$, that the return frequency may be approximated closely by:

$$f_R \cong f_0 \left( 1 + 2 \frac{V_s \cos \beta_1}{C_1} \right) \quad (6)$$

The above relationships may be seen to be predicated upon an assumption that the ship does not move during the time that a wave travels from the ship to sea floor and back. It will be seen that actually the ship will have moved forward slightly during this time, making the component of velocity of the ship against the returning waves $V_g \cos \beta_1^1$. It will be seen that if the velocity of wave propagation $C_1$ is large compared to ship speed, that the angle $B_1^1$ will not differ substantially from the angle $B_1$. Transmitting downwardly at $B_1 = 60$ degrees from a ship moving at 40 knots in water about 10,000 feet deep, $\beta_1^1$ will differ from $\beta_1$ by about 1.4°, causing a small error if the return frequency is calculated as shown above. In systems utilizing electromagnetic radiation, the speed of wave propagation is so great compared to usual vehicle speeds, that the error is insignificant.

The above relationship has been predicated upon the assumption that the medium of transmission was homogeneous and not made up of several strata having different velocities of flow and velocities of sound propagation. Assume now that upper stratum I of the fluid medium shown in Fig. 1 is flowing in the direction shown with a velocity $U_1$. It will be seen that an effect of such flow is to increase the velocity of propagation and wavelength of the transmitted waves, so that the wavelength $\lambda_1$ of transmitted waves becomes:

$$\lambda_1 = \frac{C_1 + U_1 \cos \beta_1}{f_0} - \frac{V_s \cos \beta_1}{f_0} \quad (7)$$

Now consider two successive outgoing compression peaks, a first of which is at the boundary between stratum I and stratum II, and the other of which was transmitted one cycle later and is behind the first by a distance of $\lambda_1$. In the time $t_1$ necessary for the second front to reach the boundary, the first wave will have progressed into stratum II through a distance $\lambda_2$, where $\lambda_2$ equals time $t_1$ multiplied by the velocity of propagation $(C_2 + U_2 \cos \beta_2)$ in stratum II.

$$\frac{\lambda_1}{C_1 + U_1 \cos \beta_1}$$

the wavelength $\lambda_2$ in the stratum II may be seen to equal:

$$\lambda_2 = \frac{\lambda_1}{C_1 + U_1 \cos \beta_1}(C_2 + U_2 \cos \beta_2) \quad (8)$$

Upon reflection from the sea floor, a similar shift in wavelength occurs. It will take time $t_2$ for an outgoing wave located a distance $\lambda_2$ from the floor to strike the floor and be reflected. During that time a previous wave being reflected from the floor would travel upwardly toward the ship through a distance $\lambda_3$. Distance $\lambda_3$ may be seen to equal time $t_2$ multiplied by the velocity of propagation in the media, $(C_2 - U_2 \cos \beta_2)$. It will be understood that the flow velocity $U_2$ of stratum II now affects the velocity of propagation in an opposite or negative sense. Now it may be seen that the distance $\lambda_3$ may be expressed as:

$$\lambda_3 = \lambda_1 \frac{C_2 + U_2 \cos \beta_2}{C_1 + U_1 \cos \beta_1} \times \frac{C_2 - U_2 \cos \beta_2}{C_2 + U_2 \cos \beta_2}$$

or, by cancelling terms, $$\lambda_3 = \lambda_1 \frac{C_2 - U_2 \cos \beta_2}{C_1 + U_1 \cos \beta_1} \quad (9)$$

In like manner a shift in wavelength will occur as the reflected waves leave stratum II and re-enter stratum I. If the time for successive reflected wave peaks to strike the boundary is designated $t_3$, and if the distance a wave travels in stratum I during time $t_3$ is designated $\lambda_4$, it will be seen that $\lambda_4$ equals time $t_3$ multiplied by the return velocity of propagation $(C_1 - U_1 \cos \beta_1)$ in stratum I.

$$\lambda_4 = \frac{\lambda_1}{C_1 + U_1 \cos \beta_1} \times \frac{C_2 - U_2 \cos \beta_2}{C_2 - U_2 \cos \beta_2}(C_1 - U_1 \cos \beta_1) \quad (9a)$$

Cancelling terms, $$\lambda_4 = \lambda_1 \frac{(C_1 - U_1 \cos \beta_1)}{(C_1 + U_1 \cos \beta_1)} \quad (9b)$$

Thus it will be seen that differences in velocity of flow and differences in velocity of propagation due to temperature, etc. of various intermediate strata in the fluid medium provide wavelength shifts in the outgoing waves which are cancelled by shifts of an opposite nature occurring in the reflected waves, so that the velocity of returning waves which are intercepted by a conventional sonic transducer is determined by:

$$C_1 - U_1 \cos \beta_1 + V_g \cos \beta_1 \quad (10)$$

Although the discussion has assumed only two distinct strata in the fluid medium, it will be readily apparent that the same result would be obtained no matter how many strata were assumed.

The frequency with which the sonic head intercepts reflected waves is given by the above velocity divided by wavelength $\lambda_4$, and may be expressed as follows:

$$f_R = \frac{(C_1 - U_1 \cos \beta_1 + V_s \cos \beta_1)(C_1 + U_1 \cos \beta_1)}{\lambda_1 (C_1 - U_1 \cos \beta_1)} \quad (11)$$

The difference or doppler frequency $\Delta f$ between transmitted and received energy is given by the following expression:

$$\Delta f = \frac{2 f_0}{C_1} \left[ \frac{V_s \cos \beta_1}{1 - \frac{V_s \cos \beta_1}{C_1} - \frac{U_1^2}{C_1^2} \cos 2\beta_1 + \frac{U_1 V_s}{C_1^2} \cos 2\beta_1} \right] \quad (12)$$

From Expression 12 it may be seen that the doppler frequency is dependent upon the frequency of transmission, $f_0$, the ground velocity of the vessel, $V_g$, the constants of the stratum of water at the emitting transducer, and the angle of transmission of the emitted waves. In usual sonic applications the ratio of water flow or drift to the velocity of sound propagation is seldom more than 1 to 500, and if transmitting angles near $\beta=70$ degrees are used, the terms of Expression 12 involving $U_1/C_1 \cos^2 \beta$ may be neglected with small error, to provide a simplified expression:

$$\Delta f = \frac{2f_0 V_g \cos \beta_1}{C_1}\left(1 + \frac{V_g \cos \beta_1}{C_1}\right) \quad (13)$$

Examination of Expression 13 will readily indicate that the doppler frequency received by a sonic doppler system is dependent upon the accuracy with which the transmitting angle $\beta_1$ can be determined, and that error in determining or compensating for changes in the angle $\beta_1$ will seriously affect computation of velocity based upon the received doppler frequency. Examination of Expression 13 will also reveal that the velocity $C_1$ of wave propagation in the medium at the vessel must be accurately determined, and that the frequency $f_0$ of the oscillator must be accurately measured. Errors in measuring any of these quantities provide errors in computed velocities, and, as mentioned above, the integration of erroneous velocity data may lead to very inaccurate position data. The invention, on the other hand, employs novel method and means which largely eliminate the necessity for such precise measurements.

Attempts previously have been made to provide sonic doppler method and apparatus which will remain workable in the face of pitching and rolling of the vessel. Reference may be had to U.S. Patent 1,864,638 to Chilowsky, for example, wherein compensation for pitching is attempted by employing fore and aft doppler systems and by varying the sonic fundamental frequency in accordance with pitch angle. Others have suggested controlling the transmitting angle by means of an extremely accurate gyroscope. It will immediately be apparent that the accuracy of such systems depends upon extremely precise calibration and is inherently subject to error. Furthermore, the determination of the speed of wave propagation in fluid media of varying density, temperature, salinity, etc. is necessarily an extremely difficult task if done with desired accuracy.

Figure 2:
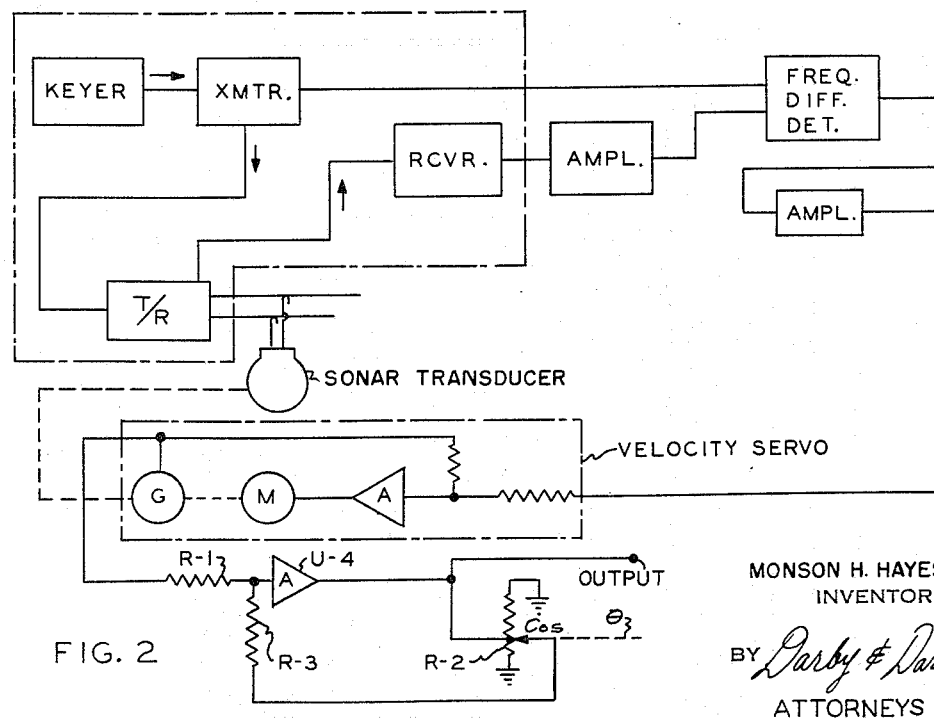
Fig. 2 is a schematic of one embodiment of the sonic doppler system of the invention using a linearly driven transducer.

Referring now to Fig. 2 there is shown in block diagram form an exemplary embodiment of the invention. Included within dashed lines are conventional sonic elements including a transmitter having a fairly stable oscillator frequency, a keyer to control operation of the transmitter, a high gain receiver and a "Transmit-Receive" or T-R switching means. The keyer periodically activates the transmitter and connects its output via the T-R switch to a conventional sonic transducer, providing wave propagation from the ship toward the object (sea floor, for example) with relation to which the ship velocity is to be determined. After a suitable period of transmission, the T-R switching means transfers the sonic transducer from the transmitter output to the receiver, and potentials generated by the transducer as a result of reflected energy intercepted by the transducer are amplified by the receiver. The receiver output is heterodyned or "beat" with the transmitter output to derive a difference or doppler frequency. Thus far the system may be seen to be entirely conventional. While a pulsed system utilizing a single transducer is indicated in Fig. 21 it will be immediately apparent to those skilled in the art that by providing separate transmitting and receiving transducers that continuous transmission and reception may be utilized.

A conventional doppler system would determine ship velocity by converting the doppler frequency output of the frequency difference detector to a computer quantity, such as an analog voltage, for example, which would be entered into computing apparatus designed to solve an equation, such as Expression 13 given above, to determine ship velocity. On the other hand, the invention contemplates deriving a control quantity which is a measure of doppler frequency, and using the control quantity to move the sonic transducer mechanically or electrically with respect to the ship so as to decrease the doppler frequency. Hence Fig. 2 illustrates a system in which the doppler frequency output is converted to an analog potential commensurate in magnitude with doppler frequency by a frequency difference detector, and in which the analog potential is amplified and applied to operate a conventional velocity servomechanism, included within dashed lines. The frequency difference detector of Fig. 2 can be similar in principle to that shown in Fig. 7 of a U.S. Patent 2,688,743 to F. B. Berger, et al. The velocity servomechanism is mechanically connected to drive the sonic transducer along the ship in a direction opposite to ship velocity tending to decrease the doppler shift or output of the frequency difference detector thereby providing a closed control loop. It will be recognized that if sufficient amplification is inserted in the loop between the doppler frequency converter and the sonic transducer, that the transducer will be driven along the ship at such a rate that the doppler frequency will very nearly approach zero. It will also be seen that the proximity with which the doppler frequency approaches zero will depend upon the control loop internal gain, and that by providing high enough loop gain the transducer may be driven at such a rate that doppler frequency may be considered to equal zero with negligible error. Assuming that the ship is traveling in still water, it will be seen that when the doppler frequency reaches zero, that the sonic transducer will actually be standing still with respect to the sea floor or other object from which the sonic energy is reflected. One need merely measure the speed at which the sonic transducer is moving along the ship at a time when the doppler frequency is zero in order to determine the velocity of the ship with respect to the reflecting object. For example, in Fig. 2 the voltage input of the generator of the conventional velocity servo is representative of the velocity at which the transducer is being moved. This voltage is connected to a velocity output terminal through resistor R-1, amplifier U-4. The function of the conventional division circuit shown in Fig. 2 as comprising cosine potentiometer R-2, a slidable wiper and resistor R-3 will be explained below. It will be apparent that this velocity measurement may be accomplished by a variety of known methods within the spirit of this invention.

Consider now a transducer which is standing still with respect to an energy-reflective object, so that the frequency difference between transmitted waves and reflected waves is zero. It will be seen that the condition of zero doppler shift will maintain regardless of the velocity $C_1$ of wave propagation in the medium. Hence no precise measurements of transmitting angle, fundamental frequency $f_0$, doppler frequency $\Delta_f$, or wave propagation constant $C_1$ need be made. Furthermore, consider the effect of water flow on a doppler system in which the transducer is standing still with respect to the object from which energy is being reflected. It will be seen that any increase in wavelength caused by flow of the medium in the direction of propagation will be exactly cancelled out after reflection, it being assumed, of course, that the water flow does not suddenly change between transmission and reception. Hence the system of the invention is also entirely unaffected by drift of the medium. It is necessary, however, to control fundamental sonic frequency from drifting between the time of transmission and reception or at least to remember the transmitting frequency long enough for energy being transmitted to make the round trip between transducer and reflective object. Those skilled in the art will readily recognize, however, that it is far easier to insure that frequency does not drift over such a short time than to make an absolute measurement of frequency as in prior art systems. Furthermore, it will be recalled that in deriving Equation 13 the distance of ship travel during the time between transmission and reception was neglected insofar as it affected the frequency and wavelength of the reflected signals received. Since the transducer of the invention stands stationary in space while ship velocity is measured, no such approximation is necessary. It will be apparent to those skilled in the art that conventional acoustic systems need not utilize the approximation, but that a rigorous expression of the phenomenon is quite complex and requires considerable additional computing apparatus.

If the transducer is to move along the vessel at such a rate that it stands still with respect to the reflecting object, it will be seen that motion of the transducer must be restricted in some manner in order for it to remain attached to the ship. Hence the invention contemplates moving the transducer from a reference point for a limited time and through a limited distance along the ship while velocity is being determined, and then restoring the transducer to the reference position, after which the process may be repeated and ship velocity may again be determined. It will be seen that the process may be repeated quickly and frequently, providing a practically continuous indication of velocity. If a pulsed system is to be used, it may comprise, for example, the step of transmitting a number of sonar frequency cycles, moving the transducer backwards along the ship so as to provide zero doppler shift as reflected waves arrive, and finally restoring the transducer to its original position, after which the process may be repeated.

It will be apparent that longitudinal velocity of the ship may be determined by means of a transducer which is driven along the longitudinal axis of the ship at a velocity equal to the ship's longitudinal velocity but in the opposite direction. A further similar system may be provided to operate laterally to determine the lateral component of ship's velocity. While it is theoretically possible to utilize the same transducer for measuring both longitudinal and lateral components of ship velocity, such transducer must be moved "diagonally" along the ship, and to obviate the readily apparent mechanical complication of such a system, I prefer to utilize separate transducer systems operating at right angles in those embodiments of the invention in which transducers are actually physically translated along or across the vessel.

It should be understood that if the vessel is pitching or rolling, that moving the transducer along or parallel to the longitudinal or lateral axis of the vessel to provide zero doppler shift determines ship velocities in a pitched or rolled axis system, and to provide velocity data in a horizontal coordinate system it will be necessary to make corrections to the measured transducer velocities at zero doppler shift. If pitch angle and roll angle of the vessel are denominated $\theta$ and $\phi$, respectively, mere division of the longitudinal transducer velocity by $\cos \theta$ and mere division of the lateral transducer velocity by $\cos \phi$ will provide sufficiently accurate output data, although it is certainly possible and sometimes desirable to perform a more rigorous axis transformation. Fig. 2 illustrates the longitudinal transducer being corrected for pitch angle $\theta$. Since the values of pitch angle and roll angle which occur in many vehicles are small so that $\cos \theta$ and $\cos \phi$ seldom depart appreciably from unity, the corrections required are small. In fact, if no corrections at all were made, pitch angles of 2.5°, 5.75° and 8° would provide velocity errors of only .05%, .1% and 1%, respectively.

Figure 3:
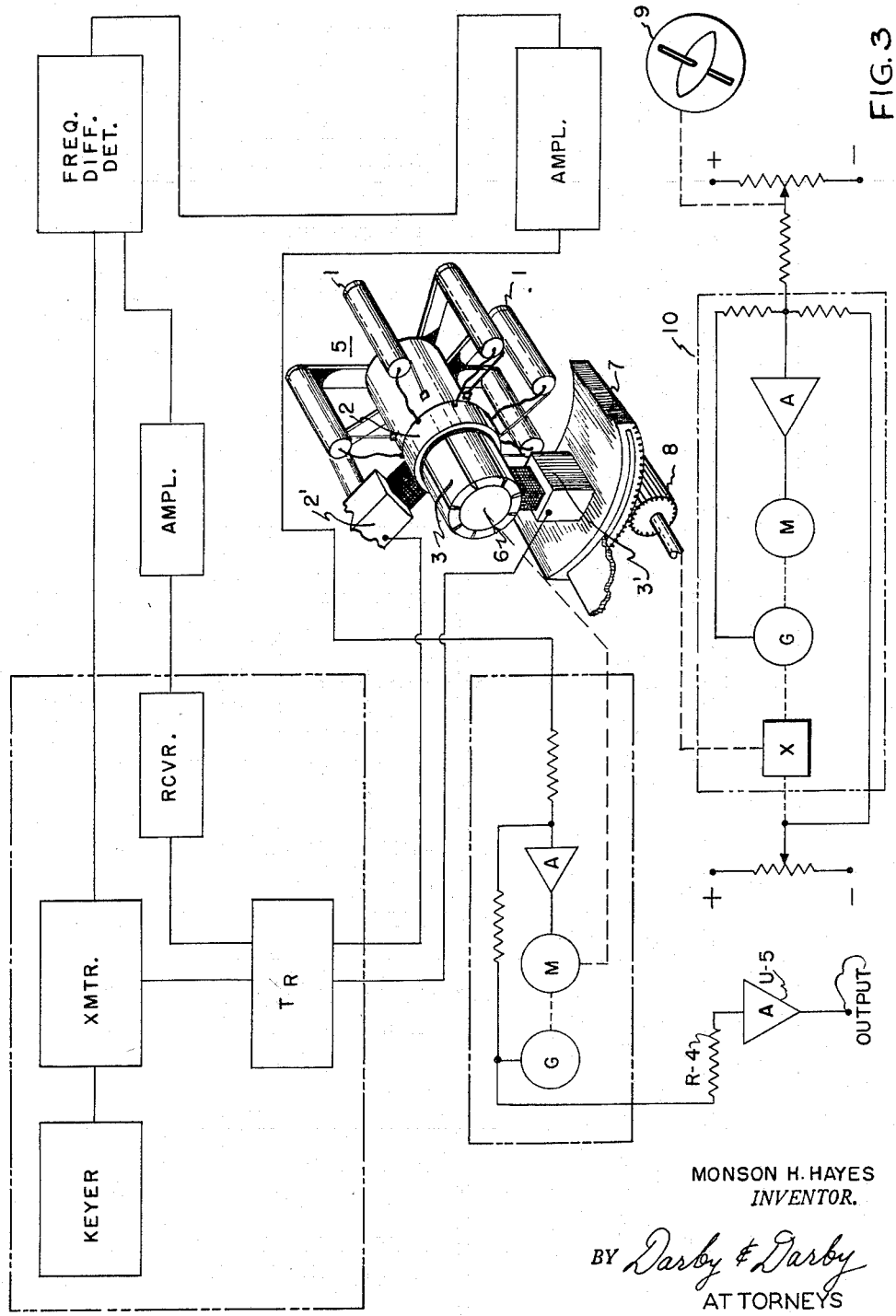
Fig. 3 is a schematic of another embodiment of the sonic doppler system of the present invention using plural rotating transducers.

An alternative embodiment of this invention consists in providing means which obviate the need for translating the sonic head along the ship's keel, and which will at the same time permit a more nearly continuous measurement of ship's velocity. Referring to Fig. 3, the single sonic transducer of Figs. 1 and 2 has been replaced by a plurality of heads arranged so as to be equally spaced around the circumference of a wheel. The diameter of this wheel is chosen so that for reasonable speeds of rotation the liner speed of any point on the circumference can be made equal to the ship's speed of forward progression over the ground. Each of the heads 1 has a return connection to the continuous slip ring 2, and a selective or commutating connection made to a segment of the commutator 3. The brushes 2' and 3' make contact with the slip ring and commutation systems respectively, and are connected to the T/R switch in place of the sonic head connection of Fig. 2.

The slip ring 2 and commutator 3 are concentrically and integrally mounted on the axis of the sonic head wheel assembly 5, and the entire system is rotated about the common axis 6 by power derived from the shaft of the velocity servo system.

It is clear from an examination of Fig. 3 that each head is connected into the circuit and rendered operative during the period of its connection to the brush 3', the position of which insures that each head is operable during the time that it is moving in a direction which is substantially parallel to the sea bed. Thus the continuous rotation of the sonic head assembly 5, together with the slip ring 2 and card commutator 3 with their respective co-operating brushes 2' and 3' have simulated the presence of a head like the fixed head of Figs. 1 and 2 which is continuously moving in a direction opposing the forward motion of the ship.

It will now be apparent to those skilled in the art, that the sonic head assembly connected according to the manner shown in Fig. 3 will form a true synthesis of the linearly moving head depicted in Figs. 1 and 2, and will be driven by the velocity servo system amplifier at a speed of rotation determined when, after the principles of this invention, the linear circumferential speed of the sonic heads in a direction parallel to the ship's keel is equal and opposite to the ship's forward ground speed and causes the system to stabilize at zero doppler condition. One need merely to measure this linear circumferential speed of these sonic heads in a direction parallel to the ship's keel at zero doppler to determine the velocity of the ship with respect to the reflecting object. It will be apparent that this velocity measurement may be accomplished by a variety of known methods. As an example, it may be noted in Fig. 3 that the voltage output of the generator of the conventional velocity servo is proportional to this velocity and that this voltage is fed to a velocity output terminal through resistor R-4 and amplifier U-5. While a mechanical commutation system has conveniently been shown in Fig. 3, electronic commutation may be substituted.

An additional servo motor is used to position the brush 3' with respect to the vertical axis by deriving a signal from a vertical gyro to obviate pitch effects, as indicated in Fig. 3, where the brush 3' is rotated about axis 6 through the track 7 and the pinion 8. The pinion 8 is made to follow the ship's pitch action through a command signal from the vertical gyro 9, which it is constrained to follow by the action of a conventional position servo within dotted lines at 10 in Fig. 3. This expedient insures that the brush 3' is at all times so disposed about the axis of rotation of the sonic wheel assembly 5 that reflected sonic energy is always being fed to the computing system from a head which is travelling in a direction substantially parallel with the sea bed, or rather, at right angles to the earth's vertical at the ship's instant position. While the embodiment of Fig. 3 has been described as a means for determining the longitudinal velocity of the ship, a similar system may be provided to operate athwartship to determine the lateral component of a ship's velocity.

In this disclosure two embodiments have been set forth which mechanically move a sonic head through the water at a speed which will cause the transducer to detect returning propagated energy at zero doppler. As is explained above, this condition exists only when there is no relative movement between the transducer and the reflecting object. The disclosure, by way of example, sets forth a marine sonic system pinging off the bottom. However, it should be pointed out that the other object could have been another vessel, submarine or navigational aid, etc. Also, it is emphasized that the transducer could well be movably mounted on a stationary support and the radiated energy propagated toward a moving object rendering the teaching of this invention useful in determining the speed of the moving object. Further, the disclosed inventive concept is broader than sonic doppler, and extends to doppler systems using radiated energy of electromagnetic frequencies. Thus the teaching of the present invention can be used in conjunction with water vessels, land vehicles and aircraft to provide an indication of their speeds relative to any object which has adequate re-radiating or reflecting qualities.

The mechanical drive means for the transducers discussed above are adequate except for measuring high relative speeds. When measuring high relative speeds following the teaching of this invention, the physical movement of the transducer together with its attendant problems, such as the power required to overcome the inertia of a physical movement of the head can be avoided by recourse to electronic artifices to accomplish this end.

It will thus be seen that the objects set forth above, among those made apparent from the preceding description, are efficiently attained, and, since certain changes may be made in carrying out the above method and in the constructions set forth without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A doppler velocity measuring system for measuring velocity with respect to a remote object, comprising a source of energy of reference frequency, a support, a transducer mounted on said support, a switching means for periodically connecting said transducer to transmit energy from said source toward said object, a receiver, said switching means alternately connecting said receiver for receiving from said transducer energy reflected from said object, a frequency difference detector responsive to both said reference frequency source and said receiver for producing a control quantity commensurate with doppler frequency difference of said reflected energy, means responsive to said control quantity to effectively move said transducer in a direction and at a speed so as to minimize said frequency difference and cause said control quantity to approach zero, and means for measuring the velocity of movement of said transducer with respect to said support.

2. A doppler velocity measuring system for measuring velocity with respect to a remote object, comprising a source of energy of a reference frequency, a support, a transducer mounted on said support, a switching means for periodically connecting said transducer to transmit energy from said source toward said object, a receiver, said switching means alternately connecting said receiver for receiving from said transducer the energy reflected from said object, a frequency difference detector responsive to both said reference frequency source and said receiver for producing a control quantity commensurate with the doppler frequency shift of said reflected energy, means responsive to said control quantity to effectively move said transducer in a direction and at a speed such that said control quantity approaches zero, said means for effectively moving said transducer comprising means for slidably supporting said transducer for linear movement in a direction substantially parallel to the direction of the velocity being measured, a motive means responsive to said control quantity, a mechanical connection between said transducer and said motive means, and means for measuring the velocity of movement of said transducer.

3. A doppler velocity measuring system for measuring velocity with respect to a remote object, comprising a source of energy of a reference frequency, a support, a transducer mounted on said support, a switching means for periodically connecting said transducer to transmit energy from said source toward said object, a receiver, said switching means alternately connecting said receiver for receiving from said transducer the energy reflected from said object, a frequency difference detector responsive to said reference frequency source and said receiver for producing a control quantity commensurate with the doppler frequency shift of said reflected energy, means responsive to said control quantity to effectively move said transducer in a direction and speed such that said control quantity approaches zero, said transducer comprising a rotatable support having a circumferential dimension, a plurality of heads arranged to be equally spaced around the circumference, commutation means for selectively connecting each head to said switching means as that head passes through an arc substantially parallel to the direction of the velocity being measured, and means for measuring the velocity of movement of said transducer with respect to the ship.

4. A doppler velocity measuring system for measuring velocity with respect to a remote object, comprising a source of energy of a reference frequency, a support, a transducer mounted on said support, a switching means for periodically connecting said transducer to transmit energy from said source toward said object, a receiver, said switching means alternately connecting said receiver for receiving from said transducer the energy reflected from said object, a frequency difference detector responsive to both said reference frequency source and said receiver for producing a control quantity commensurate with the doppler frequency shift of said reflected energy, means responsive to said control quantity to effectively move said transducer in a direction and speed such that said received energy is of zero doppler and the control quantity approaches zero, means for measuring the velocity of movement of said transducer, and means for correcting said measured velocity for deviations in attitude of said support means from a direction parallel to the velocity to be measured.

References Cited in the file of this patent

UNITED STATES PATENTS

| | | |
|---|---|---|
| 2,403,625 | Wolff | July 9, 1946 |
| 2,604,620 | McCutchen | July 22, 1952 |
| 2,614,249 | Eaton | Oct. 14, 1952 |